(12) United States Patent
Shin et al.

(10) Patent No.: US 12,422,735 B2
(45) Date of Patent: Sep. 23, 2025

(54) CAMERA ACTUATOR AND FOLDED ZOOM CAMERA MODULE INCLUDING SAME

(71) Applicant: JAHWA ELECTRONICS CO., LTD., Cheongju-si (KR)

(72) Inventors: Doo Sik Shin, Seoul (KR); In Soo Kim, Bucheon-si (KR); Hee Seung Kim, Seoul (KR); Kyu Min Lee, Bucheon-si (KR)

(73) Assignee: JAHWA ELECTRONICS CO., LTD., Cheongju-Si (KR)

( * ) Notice: Subject to any disclaimer, the term of this patent is extended or adjusted under 35 U.S.C. 154(b) by 196 days.

(21) Appl. No.: 18/246,715

(22) PCT Filed: Aug. 24, 2021

(86) PCT No.: PCT/KR2021/011248
§ 371 (c)(1),
(2) Date: Mar. 27, 2023

(87) PCT Pub. No.: WO2022/071663
PCT Pub. Date: Apr. 7, 2022

(65) Prior Publication Data
US 2023/0367181 A1 Nov. 16, 2023

(30) Foreign Application Priority Data
Sep. 29, 2020 (KR) .................. 10-2020-0127446

(51) Int. Cl.
*G03B 13/36* (2021.01)
*G03B 17/17* (2021.01)
(Continued)

(52) U.S. Cl.
CPC ............ *G03B 13/36* (2013.01); *G03B 17/17* (2013.01); *H04N 23/51* (2023.01); *H04N 23/54* (2023.01); *G03B 2205/0007* (2013.01)

(58) Field of Classification Search
CPC ..................................................... G03B 13/36
See application file for complete search history.

(56) References Cited

U.S. PATENT DOCUMENTS

| 6,215,605 B1 * | 4/2001 | Kuwana | ........... G02B 7/10 359/698 |
| 2007/0075610 A1 * | 4/2007 | Manabe | ........... H02N 2/0055 310/317 |

(Continued)

FOREIGN PATENT DOCUMENTS

| JP | 2000019375 A | 1/2000 |
| JP | 2000019376 A | 1/2000 |

(Continued)

OTHER PUBLICATIONS

International Search Report issued on Dec. 7, 2021, in corresponding International Patent Application No. PCT/KR2021/011248, 7 pages.

(Continued)

*Primary Examiner* — Noam Reisner
(74) *Attorney, Agent, or Firm* — Maier & Maier, PLLC

(57) ABSTRACT

A camera actuator for realizing auto focusing control and zoom functions and a folded zoom camera module including the same. The camera actuator includes a housing, a driving unit being mounted in the housing and having a vibration shaft and a vibration generator, a movable part mounted so as to correspond to the driving unit and configured to be moved by a driving force, a friction moving part configured to be moved in a first direction on the vibration shaft, and a connecting part mutually connecting the friction moving part and the movable part. The connecting part includes a protrusion or a recess formed on a side surface portion of the friction moving part facing the movable part, and includes a recess or a protrusion formed on a side surface portion of the movable part so as to be engaged with the protrusion or the recess.

16 Claims, 12 Drawing Sheets

(51) Int. Cl.
*H04N 23/51* (2023.01)
*H04N 23/54* (2023.01)

(56) References Cited

U.S. PATENT DOCUMENTS

2010/0097498 A1* 4/2010 Zaifrani .............. H04N 23/55
  348/240.99
2021/0132360 A1* 5/2021 Ryoo .............. G02B 13/0065

FOREIGN PATENT DOCUMENTS

| | | |
|---|---|---|
| JP | 3410250 B2 | 5/2003 |
| KR | 20080065968 A | 7/2008 |
| KR | 20080085571 A | 9/2008 |
| KR | 20110096384 A | 8/2011 |
| KR | 20130141294 A | 12/2013 |
| KR | 20170096949 A | 8/2017 |
| KR | 20180128675 A | 12/2018 |
| KR | 20180137278 A | 12/2018 |
| KR | 20200044488 A | 4/2020 |

OTHER PUBLICATIONS

Notice of Allowance issued on Jul. 8, 2022, in corresponding Korean Patent Application No. 1020200127446 6 pages.

* cited by examiner

CAMERA ACTUATOR AND FOLDED ZOOM CAMERA MODULE INCLUDING SAME

TECHNICAL FIELD

The present disclosure relates to a camera actuator. More particularly, the present disclosure relates to a camera actuator applied to a folded zoom camera module for realizing high-magnification zoom and auto-focusing functions, and relates to a folded zoom camera module including the camera actuator.

BACKGROUND

Most conventional camera modules mounted in mobile devices realize zoom and auto-focusing functions by moving an optical system including a plurality of lenses in an optical axis direction that is a direction in which light is introduced. At this time, a moving direction of the optical system is a thickness direction of a mobile device when a camera module is mounted in the mobile device. Therefore, conventionally, a minimum space in which the optical system of the camera module is capable of being moved in the thickness direction of the mobile device is required to be secured.

That is, in most of the conventional camera modules in which the optical system is moved in the thickness direction of the mobile device, since a minimum space capable of mounting the camera module in the mobile device during mounting the camera module is required to be secured in the thickness direction of the mobile device, there is a structural limitation that it is difficult to satisfy a market demand in the recent slimming trend to realize a thinner mobile device thickness.

Conventionally, in order to solve this problem, there have been studies to reduce a size of the optical system by adjusting an angle, a size, a distance, a focal length, and so on of a lens. However, since this method is a method of physically reducing a size of a zoom lens or a size of a zoom lens barrel, there is a limitation in realizing slimness, and there is a problem that essential characteristics of the zoom lens may be degraded.

Therefore, a folded zoom camera module has been proposed. In the folded zoom camera module, a reflectometer reflecting light from the outside at 90 degrees is mounted, and an optical system that passes light refracted by the reflectometer is laid in a width or length direction of a mobile device so that a distance between lenses constituting the optical system is sufficiently secured, thereby realizing a high-magnification optical zoom function and slimness.

In the folded zoom camera module, unlike a conventional method in which a sensor (an imaging device such as a CCD, a CMOS, and so on) and lenses are vertically stacked, a periscope structure is adopted, so that the high-magnification optical zoom function is capable of being realized without increasing the overall height. In addition, since the periscope structure that is different from the conventional method in which the lenses are vertically stacked is applied, the folded zoom camera module is advantageous in terms of realizing slimness of a module comparing to the conventional method.

As key factors that decisively affect a zoom performance of a camera, not only specifications of lenses constituting an optical system but also a driving range of the optical system are included. As the driving range of the optical system increases, an improved zoom performance may be realized. In a small camera mounted with a conventional zoom lens, a stepping motor-type driving mechanism is mainly used as a driving mechanism for increasing a driving range of an optical system.

However, the conventional stepping motor-type driving mechanism has a problem that an overall volume of the small camera is increases due to a size of a stepping motor. That is, since the volume of the stepping motor is large, a sufficient space is required to be secured. However, in order to secure the sufficient space, the overall volume of the small camera is required to be increased.

As such, the stepping motor-type driving mechanism applied as an optical system driving apparatus in the conventional folded zoom camera module has a disadvantage in reducing a size of the apparatus. Therefore, as an alternative to the conventional stepping motor-type driving mechanism, a piezo-type driving mechanism using a piezoelectric element becomes popular recently. The piezo-type driving mechanism is realized on a principle of using vibration to drive an optical system, the vibration being generated when a high-frequency pulse voltage is applied to the piezoelectric element.

Such a piezo-type driving mechanism uses a piezoelectric element having a size that is much smaller than a size of a motor in the conventional stepping motor-type driving mechanism, so that there is an advantage in miniaturizing a camera module comparing to the stepping motor-type driving mechanism. In addition, since the piezoelectric element generating a driving force is much lighter than the motor of the conventional stepping motor-type driving mechanism, an overall weight of the camera module is capable of being reduced. That is, light-weight of a product may be realized.

FIG. 10 is a schematic view illustrating a piezo-type optical system driving apparatus applied in a camera module.

Referring to FIG. 10, a conventional piezo-type optical system driving apparatus 8 includes a piezoelectric element 80 and a vibration shaft 82 fixed to a first side of the piezoelectric element 80. a friction member 70 is integrally provided at a side surface portion of a lens barrel 7 that constitutes an optical system, and the friction member 70 is coupled to the vibration shaft 82 in a structure in which the friction member 70 surrounds a part of an outer surface of the vibration shaft 82 in a circumferential direction. Furthermore, the friction member 70 is fixed on the vibration shaft 82 by a frictional force with the vibration shaft 82, and the friction member 70 is moved along the vibration shaft 82 when the vibration shaft 82 is vibrated.

In such a conventional piezo-type optical system driving apparatus 8, when the piezoelectric element 80 is rapidly vibrated in a first direction by a high-frequency pulse voltage applied from the outside, the vibration shaft 82 is also vibrated in the first direction (an axis direction of the vibration shaft) while the vibration shaft 82 rapidly repeats extension and contraction. At this time, when the vibration shaft 82 rapidly moves in a direction of extension and moves slowly in a direction of contraction, the friction member 70 and the lens barrel 7 moving part 70 and the first movable part 7 are moved in a direction in which the vibration shaft 82 contracts.

That is, when the vibration shaft 82 rapidly extends, the friction member 70 and the lens barrel 7 are not moved due to a tendency to maintain a stationary state (a stationary inertia). However, in a contraction direction of the vibration shaft 82 moving relatively slowly, by a frictional force acting between the friction member 70 and the vibration shaft 82, the friction member 70 and the lens barrel 7 are moved together in the direction in which the vibration shaft 82 contracts.

In this configuration, the driving apparatus 8 formed of the piezoelectric element 80 and the vibration shaft 82 only serves to move the lens barrel 7 simply in the first direction. Therefore, at least one guide pin 9 for performing optical axis alignment of the lens barrel 7 with respect to an image sensor (not illustrated) positioned rearward is required to be provided. At this time, together with the optical axis alignment, the guide pin 9 also serves to guide a linear motion of the lens barrel 7 in the first direction and to restrain tilting.

However, due to the application of the guide pin 9, the structure becomes complicated, and assembling is difficult as much as the complicated structure, so that there is a problem of poor mass productivity. Particularly, there is a disadvantage that tolerance management is strictly required in a production of a product. When a parallel state of the guide pin 9 and the vibration shaft 82 is slightly skewed or when the vibration shaft 82 is bent, the lens barrel 7 may be caught between the guide pin 9 and the vibration shaft 82, so that a movement may not be performed smoothly or an immovable state of the lens barrel 7 may occur.

Particularly, the application of the conventional piezo-type optical system driving apparatus to a conventional camera actuator that moves an optical system in a thickness direction of a mobile device has only been studied, and there are few application cases in a folded zoom camera module, so that a piezo-type driving apparatus suitable for characteristics of the folded zoom camera module is required to be developed.

SUMMARY

Accordingly, the present disclosure has been made keeping in mind the above problems occurring in the related art, and an objective of the present disclosure is to provide a camera actuator and a folded zoom camera module including the camera actuator that is a piezo-type camera actuator advantageous for realizing miniaturization and light-weight comparing to a conventional stepping motor-type camera actuator, the camera actuator being configured such that a slight misalignment of an optical axis direction alignment of a vibration shaft and bending of the vibration shaft do not affect mobility of an optical system.

According to an aspect of the present disclosure, there is provided a camera actuator including:
a housing;
at least two movable parts mounted in the housing, the movable parts being configured to be independently driven along a first direction, thereby realizing zoom and auto-focusing functions; and
at least two driving units mounted in the housing, the driving units having respective piezoelectric elements for driving the movable parts in the first direction,
wherein the piezoelectric elements are disposed to be opposed to each other in a diagonal direction with respect to an axis line in the first direction passing through centers of the movable parts, and
a ball guide supporting the movable parts such that the movable parts are capable of performing a rolling motion in the first direction.

In addition, the camera actuator may further include:
a friction moving part configured to be moved in the first direction along a vibration shaft connected to an associated one of the piezoelectric elements; and
a connecting part mutually connecting the friction moving part and an associated one of the movable parts,
wherein the connecting part may include a protrusion or a recess formed on a side surface portion of the friction moving part facing each of the movable parts, and may include a recess or a protrusion formed on a side surface portion of each of the movable parts so as to be engaged with the protrusion or the recess formed on the side surface portion of the friction moving part.

Preferably, a camera actuator according to an aspect of the present disclosure includes:
a housing;
a driving unit mounted in the housing, the driving unit including a vibration shaft that extends in a first direction, and the driving unit including a vibration generator configured to apply vibration to the vibration shaft in the first direction;
a movable part mounted so as to correspond to the driving unit, the movable part being configured to be moved in the first direction within the housing by a driving force generated by the driving unit;
a friction moving part configured to be moved in the first direction on the vibration shaft; and
a connecting part mutually connecting the friction moving part and the movable part,
wherein the connecting part includes:
a protrusion or a recess formed on a side surface portion of the friction moving part facing the movable part; and
a recess or a protrusion formed on a side surface portion of the movable part so as to be engaged with the protrusion or the recess formed on the side surface portion of the friction moving part.

Preferably, the protrusion may be a magnet, and a thin plate having a magnetic material that generates an attractive force with the protrusion formed of the magnet may be attached to a first side surface of the recess such that a movement of the protrusion in the first direction within a section where the recess is formed is restrained and a movement of the protrusion in a second direction that is orthogonal to the first direction is allowed.

As another preferable example, the protrusion may be formed of a magnetic material, and a thin plate-type magnet that generates an attractive force with the protrusion having the magnetic material may be attached to a first side surface of the recess such that a movement of the protrusion in the first direction within a section where the recess is formed is restrained and a movement of the protrusion in a second direction that is orthogonal to the first direction is allowed.

As still another preferable example, an elastic means elastically in close contact with the protrusion may be mounted at a first side surface of the recess such that a movement of the protrusion in the first direction within a section where the recess is formed is restrained and a movement of the protrusion in a second direction that is orthogonal to the first direction is allowed.

In this situation, the elastic means may be a leaf spring or a ball plunger that is formed of a ball and a spring, the leaf spring or the ball plunger being configured to apply an elastic force to the protrusion so that a first side surface of the protrusion is in close in contact with other first side surface of the recess facing the protrusion.

In addition, in the present disclosure, the driving unit may include two or more driving units, and the movable part may include two or more movable parts so as to correspond one-to-one to the two or more driving units.

Preferably, each of the driving units may include: a first driving unit positioned to be adjacent to a first side wall of the housing and mounted in the housing, the first driving unit including the vibration shaft that extends in the first direction, and the first driving unit including the vibration generator configured to apply vibration to the vibration shaft in the first direction; and a second driving unit positioned to be adjacent to a second side wall facing the first side wall, the second driving unit having a configuration that is the same as a configuration of the first driving unit and in which a position of the vibration generator of the second driving unit is reversed, and wherein each of the movable parts may include: a first movable part configured to perform a translation motion in the first direction within the housing by a driving force generated by the first driving unit; and a second movable part coaxially aligned with the first movable part in the first direction within the housing, the second movable part being configured to perform a translation motion in the first direction in the first direction within the housing by a driving force generated by the second driving unit.

At this time, the two or more movable parts may be configured to be independently driven in the first direction by each of the driving units respectively corresponding to the two or more movable parts.

In addition, at least two Hall sensors may be aligned to be spaced apart from each other in the first direction on each of first and second side walls of the housing, the second side wall facing the first side wall, and Hall magnets corresponding to the Hall sensors may be mounted on a side surface of a first movable part facing the first side wall and on a side surface of a second movable part facing the second side wall.

In addition, the movable part may include: a carrier; and a lens barrel mounted on the carrier, the lens barrel accommodating a lens group that includes a plurality of lenses.

In addition, the vibration generator of the driving unit may be a piezo motor including a piezoelectric element.

In addition, the friction moving part may include: a lower friction block having a groove that has a shape of a cross-sectional area which is an arc shape or an angular shape; and an upper friction clip coupled to the lower friction block from an upper portion of the lower friction block with the vibration shaft interposed therebetween, the upper friction clip having a shape of a cross-sectional area that is same as and vertically symmetrical with the shape of the cross-sectional area of the groove.

In addition, according to an aspect of the present disclosure, the camera actuator may further include a ball guide guiding a translation motion in the first direction of the movable part with respect to the housing from between the housing and the movable part.

In this situation, preferably, the ball guide may include: a pair of ball rails each having a first ball recess which is disposed and elongated on an upper surface of a bottom portion of the housing along the first direction and which is continuous in the first direction; a second ball recess formed in a first side and an opposing second side of a lower surface of the movable part so as to correspond to the first ball recess; and balls interposed between the first ball recess and the second ball recess that correspond to each other so as to face each other.

Preferably, the second ball recess may be a pocket type ball recess, and at least two second ball recesses may be formed in the first side and the opposing second side of the lower surface of the movable part so that independent space shapes are formed.

The balls may be interposed one by one in each of the second ball recesses formed in the independent space shapes.

In addition, according to an aspect of the camera actuator, the housing may be formed of a magnetic material, and a magnet may be mounted at a lower surface of the movable part facing an upper surface of a bottom portion of the housing.

According to another aspect of the present disclosure, there is provided a folded zoom camera module including:

the camera actuator according to the foregoing aspect;

a reflectometer disposed in front of the camera actuator with respect to a moving direction of light, the reflectometer reflecting light incident from the outside toward the camera actuator; and an image sensor unit disposed in rear of the camera actuator with respect to the moving direction of light, the image sensor unit being configured to receive light passing through the camera actuator and generate and output image information corresponding to light that is received.

In the camera actuator according to an embodiment of the present disclosure, even if an alignment state of the vibration shaft (otherwise, the movable part) in the first direction is slightly skewed during an assembling process or even if a change occurs in a distance between the movable part and the friction moving part when a bending occurs in the vibration shaft during a process in which the vibration shaft is vibrated, the connecting part is capable of responding to the change in the distance, so that the movable part is capable of being smoothly moved in the first direction without being affected.

That is, a problem of a conventional technology (a problem in which a movable part is not smoothly moved in the first direction or becomes an immovable state) may be clearly and definitively resolved, in which a misalignment of the vibration shaft (otherwise, the movable part) or an uneven distance (a situation in which a distance between the movable part and the vibration shaft should be maintained uniformly over an entire moving range (a stroke) of the movable part but is not satisfied) between the movable part and the vibration shaft due to bending and so on of the vibration shaft affects mobility of the movable part.

In addition, by applying a piezo-type camera actuator that is advantageous for realizing miniaturization and light-weight comparing to a conventional stepping motor-type camera actuator, the configuration is simple and assembling is as easy as the simple configuration, so that the present disclosure is advantageous in terms of mass production of a product. Furthermore, since the movable part performs a smooth and stable linear motion by the ball guide while being in close contact with the bottom portion of the housing by the magnet mounted at the lower surface of the movable part, a separate guide pin for optical axis alignment is not required.

DETAILED DESCRIPTION OF THE EMBODIMENTS

Figure 1:
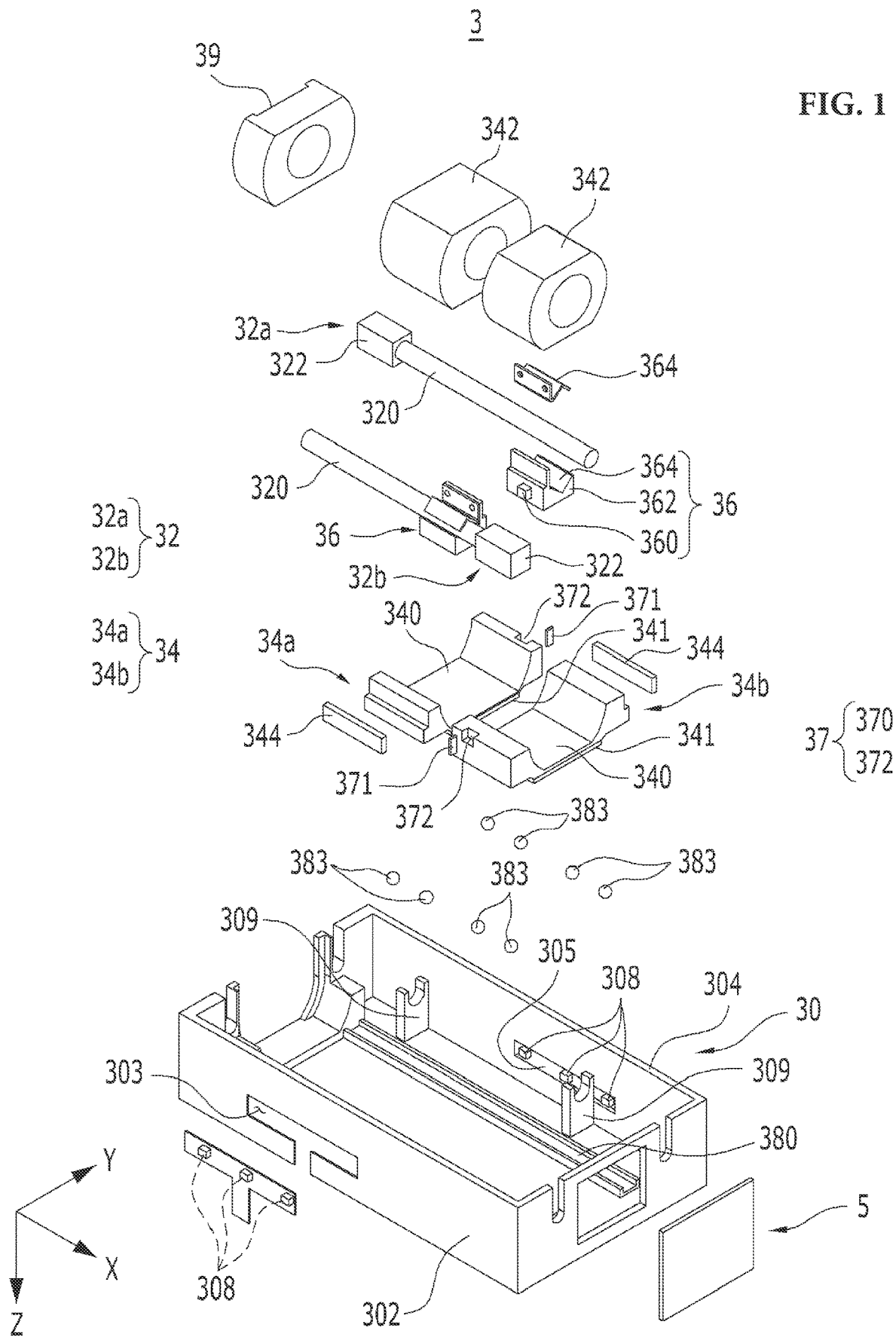
FIG. 1 is an exploded perspective view illustrating a camera actuator according to an aspect of the present disclosure.

Hereinafter, an exemplary embodiment of the present disclosure will be described in detail.

The terms used in the present specification are only used to describe specific embodiments, and are not intended to limit the present disclosure. As used herein, the singular forms are intended to include the plural forms as well, unless the context clearly indicates otherwise.

It is to be understood that terms such as 'including', 'having', and so on are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

In addition, terms 'first', 'second', and so on can be used to describe various elements, but the elements are not to be construed as being limited to the terms. The terms are only used for the purpose of distinguishing one element from another element.

In addition, the terms ' . . . part', ' . . . unit', ' . . . module', and the like described herein may mean a unit for processing at least one function or operation, and they may be implemented in hardware, software, or a combination of hardware and software.

In the following description referring to the accompanying drawings, the same components are given the same reference numerals and are not repeatedly described. In describing the present disclosure, a detailed description of known technologies will be omitted when it may obscure the subject matter of the present disclosure.

Hereinafter, in describing the present disclosure, a three-axis direction coordinate system will be used for the convenience of description.

In the drawings, an X-axis refers to a direction in which light passes through an actuator of the present disclosure, i.e., an optical axis direction. Hereinafter, a term 'first direction' will be used to refer to a direction that is coincident with or parallel to the X-axis. In addition, a Z-axis refers to a direction perpendicular to the X-direction, and a Y-axis refers to a direction orthogonal to the X-axis on a plane that is orthogonal to the Z-axis. Hereinafter, a term 'second direction' will be used to refer to a direction that is coincident with or parallel to the Y-axis.

According to an aspect of the present disclosure, a camera actuator in which a movable part including a lens barrel (an optical system) is configured to be moved by a predetermined distance with respect to an optical axis direction by using vibration generated by a piezoelectric element with a high-frequency pulse voltage applied from the outside, thereby realizing zoom in, zoom out, and auto-focusing functions.

Hereinafter, in describing the present disclosure, a configuration in which two movable parts are disposed to be spaced apart from each other in the first direction in one camera actuator and driving units are respectively disposed on the two movable parts will be illustrated and described as an example. Of course, the example is one exemplary embodiment for describing the present disclosure, and it should be understood that the number of movable parts and the number of driving units are not meant to be limited to the illustrated form in the drawings.

In other words, the example is one exemplary embodiment for describing the present disclosure. Hereinafter, the configuration in which two movable parts and two driving units are disposed in one camera actuator is exemplified and described, but the movable parts and the driving units are not limited to two pairs. This is because the number of movable parts and the number of driving units can vary according to a required specification of a camera.

Figure 2:
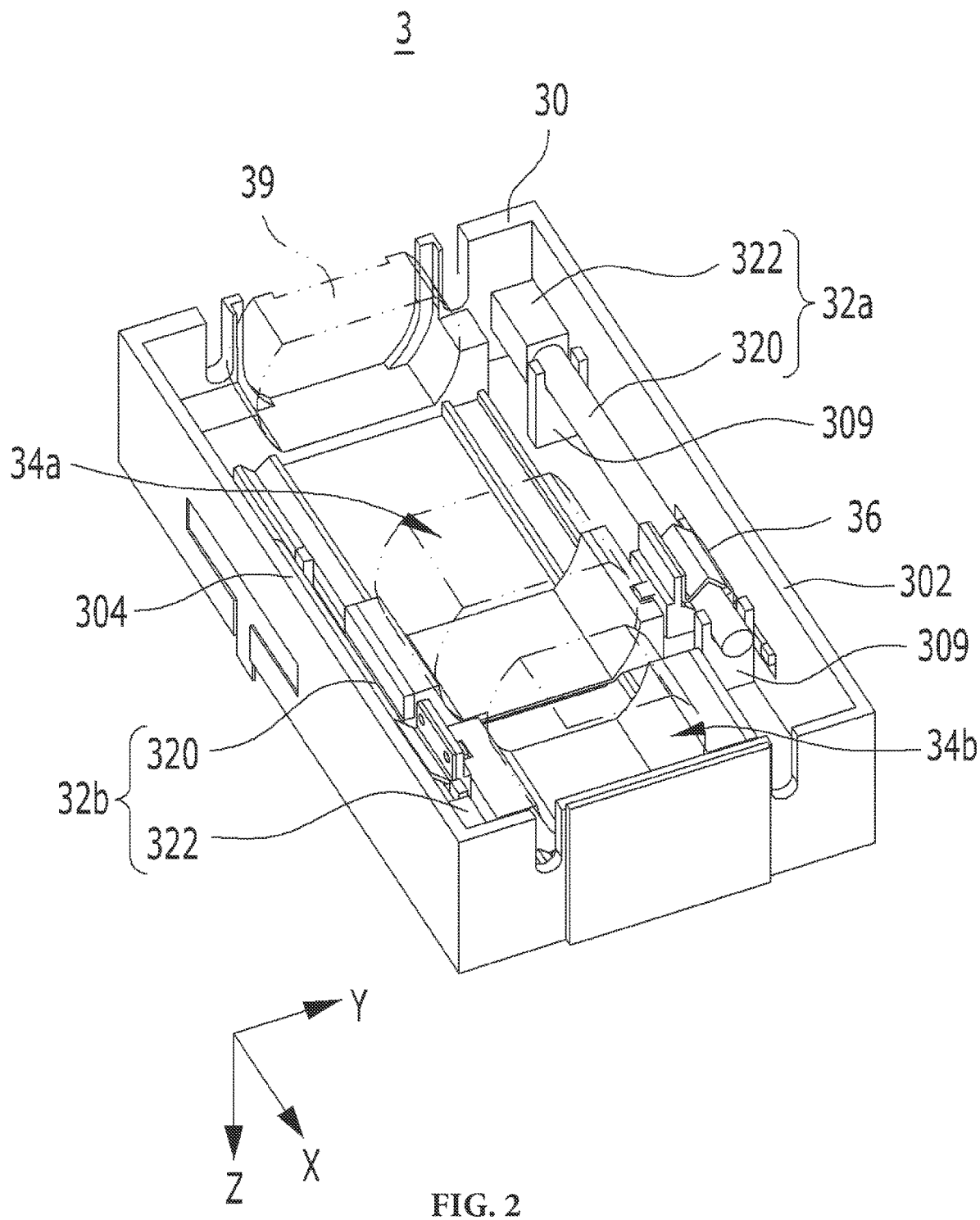
FIG. 2 is an assembled perspective view illustrating the camera actuator according to an aspect of the present disclosure.

FIG. 1 is an exploded perspective view illustrating a camera actuator according to an aspect of the present disclosure, and FIG. 2 is an assembled perspective view illustrating the camera actuator according to an aspect of the present disclosure. In addition, FIG. 3 is a plan view illustrating the camera actuator in FIG. 2 when viewed from above.

Figure 3:
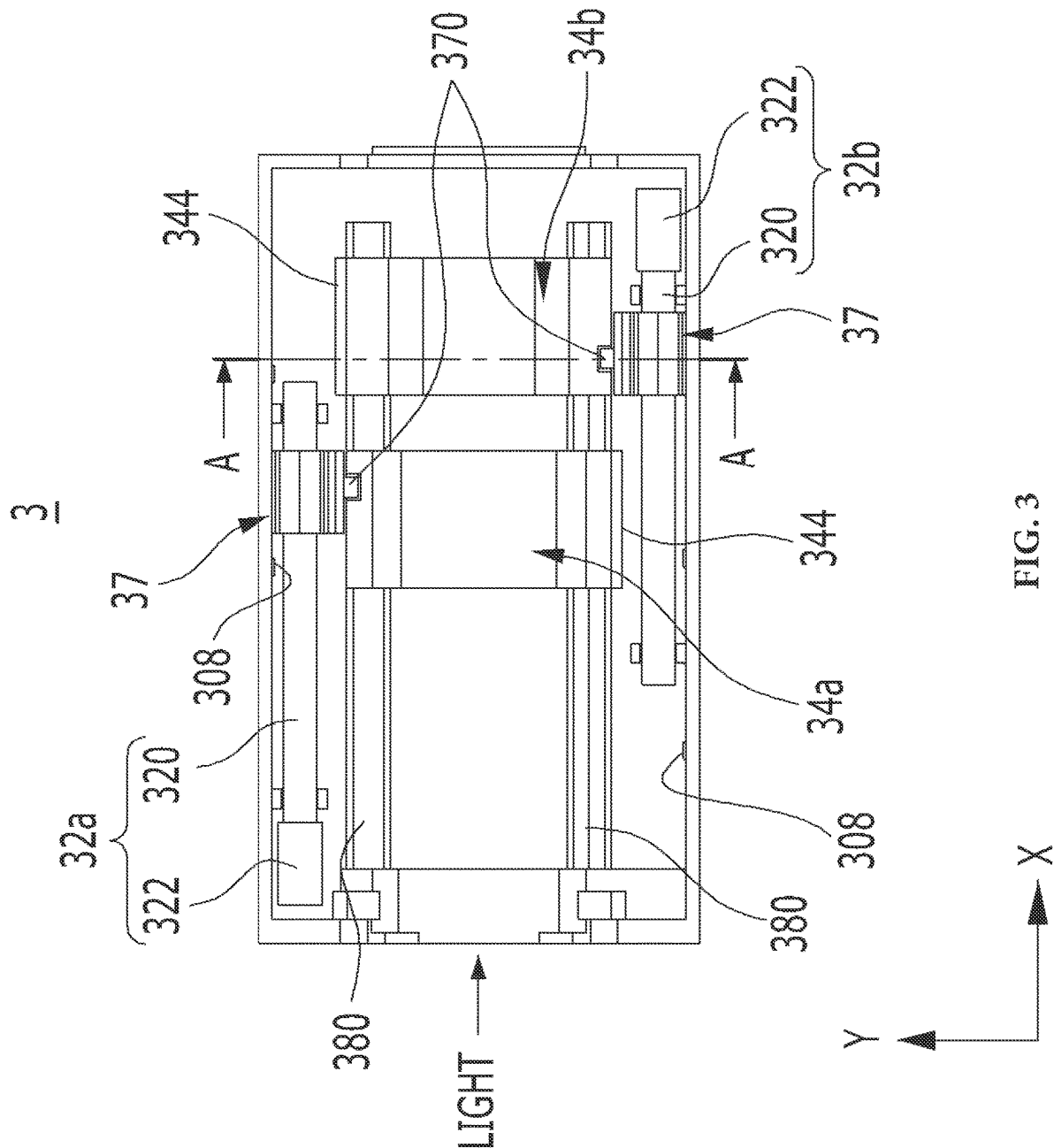
FIG. 3 is a plan view illustrating the camera actuator in FIG. 2 when viewed from above.

Referring to FIGS. 1 to 3, a camera actuator 3 according to an aspect of the present disclosure includes a housing 30. As illustrated in the drawings (FIGS. 1 and 2), the housing 30 may have an inner side provided with an accommodating space (reference numeral omitted) that is open at a first side and an opposing second side thereof in a direction (the first direction) in which light moves, and may have openings 303 and 305 having thin and elongated slit shapes in the first direction and being respectively formed in both side walls 302 and 304 in the second direction.

A ball rail 380 of a ball guide 38 that will be described later is formed on an upper surface of an inner bottom portion of the housing 30. In addition, at least one support member 309 having an arc-shaped groove is provided on the upper surface of the bottom portion, the at least one of support member 309 being positioned to be adjacent to the both side walls 302 and 304 (hereinafter, a side wall positioned at a first side is referred to as 'a first side wall 302', and a side wall positioned at an opposing second side is referred to as 'a second side wall 304'.), and a vibration shaft 320 that will be described later is accommodated on the support member 309.

An upper cover that is not illustrated is coupled to the housing 30 from an upper side of the housing 30, and a driving unit 32 and a movable part 34 that is configured to be moved along the first direction within the housing 30 by a driving force generated by the driving unit 32 are mounted at an inner portion of the housing 30. At this time, the driving unit 32 includes the vibration shaft 320 that extends in the first direction. In addition, the driving unit 32 is provided with a vibration generator 322 that is configured to apply vibration to the vibration shaft 320 in the first direction.

The vibration shaft 320 of the driving unit 32 is disposed in the first direction within the housing 30, and is supported from the bottom portion of the housing 30 by the support member 309 so as to be in a floating state. It is preferable that the vibration shaft 320 has a round rod shape having a circular cross-sectional area, but a rod-shaped structure having an angular cross-sectional area is also acceptable.

Furthermore, since a shape of the groove of the support member 309 may vary according to a shape of a cross-sectional area of the vibration shaft 320, the shape of the groove is not limited to the arc shape.

The vibration shaft 320 is accommodated on the groove of the support member 309 such that a part of an outer surface of the vibration shaft 320 is in contact with the groove of the support member 309 in a circumferential direction, and a space between two elements (the space between the vibration shaft 320 and the support member 309) may be mutually coupled to each other by an adhesive so that the vibration shaft 320 is not separated from the support member 309 when the vibration shaft 320 is vibrated. Here, a soft epoxy having an elasticity enough to allow a piezo movement of the vibration shaft 320 that extends and contracts in the first direction by the vibration generator 322 may be used as an adhesive.

As illustrated in the example in the drawings, when the number of movable parts 34 is two, the number of driving units 32 may also be two. For the convenience of the description, among the two movable parts 34, a movable part positioned relatively forward with respect to a moving direction of light is referred to as 'a first movable part 34a', and a movable part positioned relatively backward is referred to as 'a second movable part 34b'. In addition, in describing the present disclosure, driving units respectively corresponding to the first movable part 34a and the second movable part 34b are classified into a first driving unit 32a and a second driving unit 32b.

The first driving unit 32a may be positioned to be adjacent to the first side wall 302 of the housing 30, and may be mounted at the inner portion of the housing 30. The first driving unit 32a may include the vibration shaft 320 that extends in the first direction, and may include the vibration generator 322 that is configured to apply vibration to the vibration shaft 320 in the first direction. In addition, the second driving unit 32b may be positioned to be adjacent to the second side wall 304 of the housing 30, and may be mounted at the inner portion of the housing. Furthermore, the configuration of the second driving unit 32b may be the same as the configuration of the first driving unit 32a, and a position of the vibration generator 322 may be reversed.

That is, as illustrated in the plan view of FIG. 3, respective vibration generators 322 of the first driving unit 32a and the second driving unit 32b may be disposed to be opposed to each other in a diagonal direction with respect to an axis line in the first direction passing through centers of two movable parts 34a and 34b. As such, when the respective vibration generators 322 of the first driving unit 32a and the second driving unit 32b are disposed to be opposed to each other in the diagonal direction, a relative separation distance between the first driving unit 32a and the second driving unit 32b may be maximally secured within a limited space.

Each vibration generator 322 of the first driving unit 32a and the second driving unit 32b may be a piezo motor including a piezoelectric element that is configured to be rapidly vibrated in the first direction by a high-frequency pulse voltage applied from the outside, and may be respectively mounted at a first side edge of the housing 30 and a second side edge of the housing 30 in the diagonal direction. In addition, two vibration shafts 320 may be parallel to each other, and may be configured such that at least a part of the two vibration shafts 320 overlap when the two vibration shafts 320 are viewed in the second direction.

The first movable part 34a is configured to perform a translation motion in the first direction along the ball rail 380 within the housing 30 by a driving force generated by the first driving unit 32a. Furthermore, the second movable part 34b is disposed to be spaced apart from the first movable part 34a by a predetermined distance within the housing 30 in the first direction, and the second movable part 34b is also configured to perform a translation motion in the first direction along the ball rail 380 within the housing 30 by a driving force generated by the second driving unit 32b.

Both the first driving unit 32a and the first movable part 34a and both the second driving unit 32b and the second movable part 34b are coupled to each other by a friction moving part 36 and a connecting part 37 so that corresponding driving units 32 and movable parts 34 mutually interlock with each other. Furthermore, the first driving unit 32a and the second driving unit 32b are configured to be driven independently by individual signals output from a control unit which is a driver IC (not illustrated) as an example. Accordingly, the first movable part 34a and the second movable part 34b may also be driven independently in the first direction by the corresponding driving units 32.

The first movable part 34a and the second movable part 34b respectively include a carrier 340. In addition, the first movable part 34a and the second movable part 34b respectively include a lens barrel 342 that accommodates a lens group constituted of a plurality of lenses. The lens barrel 342 is mounted on the carrier 340 and is configured to be moved together with the carrier 340, but the lens barrel 342 may be formed integrally with the carrier 340 in some cases. At this time, each lens constituting the lens barrel 342 may have the same or different optical characteristics such as a focal length, a refractive index, and so on.

Respective friction moving parts 36 described above are configured to be moved in the first direction along the corresponding vibration shafts 320 on the vibration shafts 320 of the first driving unit 32a and the second driving unit 32b. In addition, the friction moving parts 36 are connected to the corresponding movable parts 34 via the connecting parts 37. Accordingly, when the vibration shaft 320 is vibrated, the friction moving part 36 is moved along the vibration shaft 320, and as a result, the movable part 34 connected to the friction moving part 36 via the connecting part 37 is moved in the first direction.

For example, when the vibration generator 322 of the first driving unit 32a is rapidly vibrated in the first direction by a high-frequency pulse voltage applied from the outside, the corresponding vibration shaft 320 is also vibrated while the corresponding vibration shaft 320 rapidly and repeatedly extends and contracts in the first direction (an axis direction of the vibration shaft 320). At this time, when the vibration shaft 320 rapidly moves in a direction of extension and moves slowly in a direction of contraction, the friction moving part 36 and the first movable part 34a are moved in a direction in which the vibration shaft 320 contracts.

That is, when the vibration shaft 320 rapidly extends, the friction moving part 36 and the first movable part 34a are not moved due to a tendency to maintain a stationary state (a stationary inertia). However, in a contraction direction of the vibration shaft 320 moving relatively slowly, by a frictional force acting between the friction moving part 36 and the vibration shaft 320, the friction moving part 36 and the first movable part 34a connected to the friction moving part 36 are moved together with the vibration shaft 320 in the direction in which the vibration shaft 320 contracts.

Figure 4A:
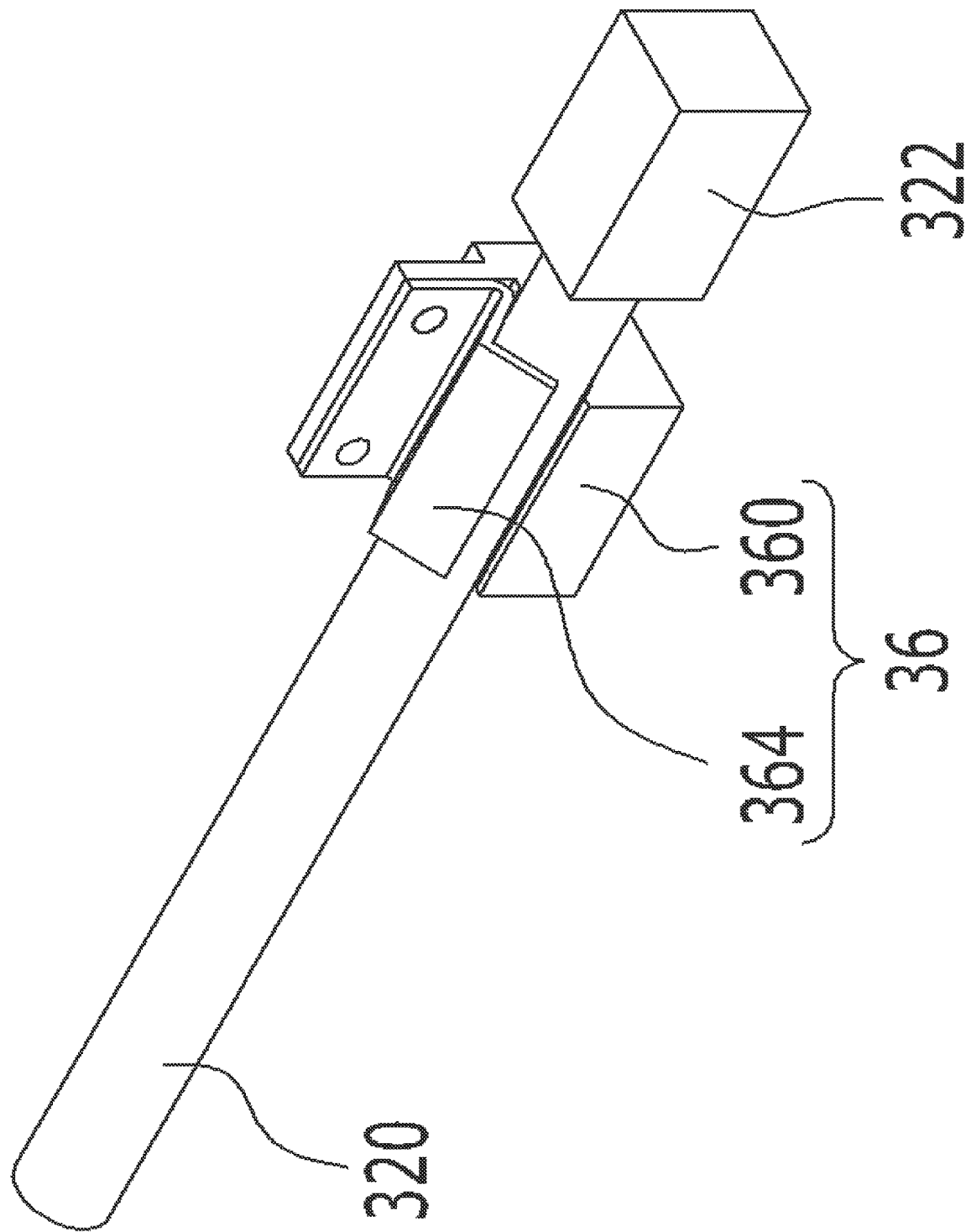
FIG. 4 shows perspective views illustrating a driving unit to which a friction moving part is coupled.
Figure 4B:
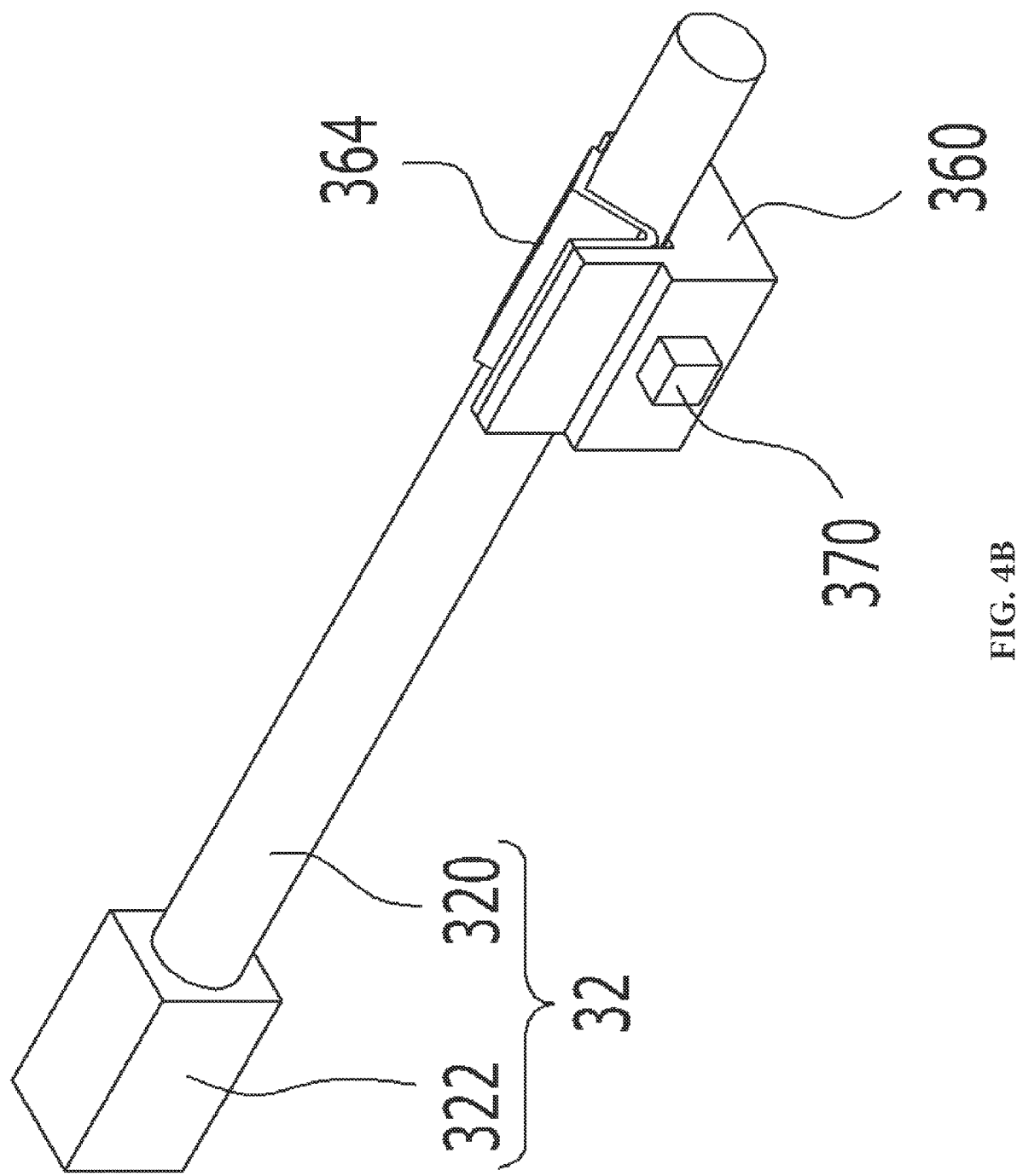

FIG. 4 shows views illustrating a driving unit to which a friction moving part is coupled.

Referring to FIG. 4, as described above, the vibration shaft 320 of the driving unit 32 may have the round rod shape having the circular cross-sectional area, but is not limited thereto. Furthermore, the friction moving part 36 may include a lower friction block 360 having a groove 362 that has an arc-shaped cross-sectional area or an angular-shaped cross-sectional area, and may include an upper friction clip 364 coupled to the lower friction block 360 with the vibration shaft 320 interposed therebetween from an upper portion of the lower friction block 360, the upper friction clip 364 having a shape of a cross-sectional area that is same as and vertically symmetrical with the shape of the cross-sectional area of the groove 362.

The shape of the groove 362 and the shape of the upper friction clip 364 may be any shape having cross-sectional shapes capable of providing a friction surface in contact with a part of an outer surface of the vibration shaft 320. For example, as illustrated in FIG. 4, the groove 362 and the upper friction clip 364 may have a quadrangle-shaped cross-sectional area such that a total of four friction surfaces are formed. At this time, the vibration shaft 320 may contact all four friction surfaces, or may contact three friction surfaces, two friction surfaces, or one friction surface.

Figure 5:
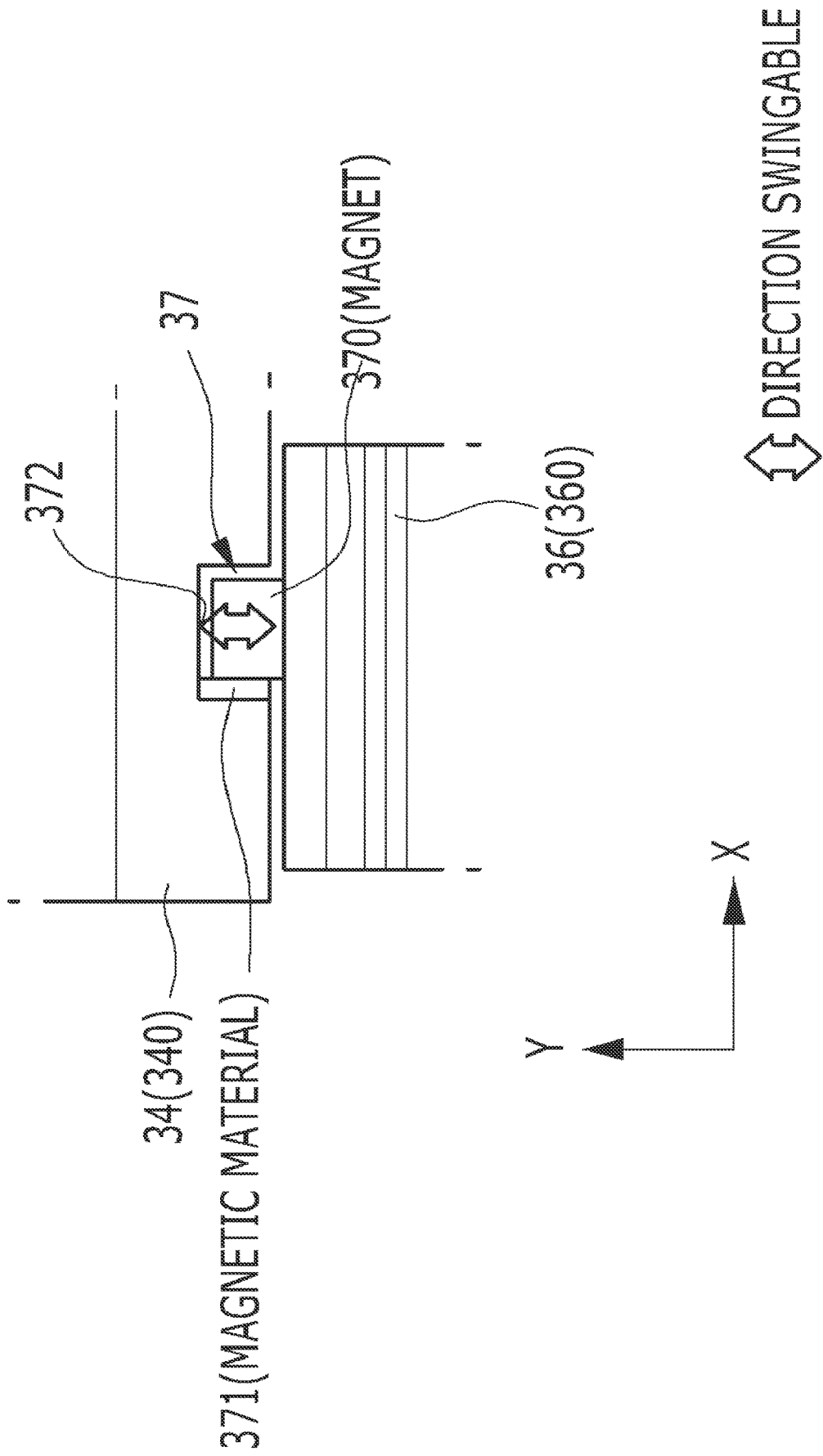
FIG. 5 is a view illustrating an exemplary embodiment of a part (a connecting part) to which the friction moving part and a movable part are coupled.

FIG. 5 is a view illustrating an exemplary embodiment of a part (a connecting part) to which the friction moving part and a movable part are coupled.

As illustrated in FIG. 5, the friction moving part 36 and the movable part 34 that are corresponding to each other are mutually connected to each other via the connecting part 37. The connecting part 37 may be constituted of: a protrusion 370 formed on a side surface portion of the friction moving part 36 facing the movable part 34; and a recess 372 formed in a side surface portion of the movable part 34 so as to be engaged with the protrusion 370. Otherwise, although not illustrated, the connecting part 37 may be constituted of a recess formed in the friction moving part 36 and a protrusion formed on the movable part 34.

The protrusion 370 that constitutes the connecting part 37 may preferably be a magnet, and a thin plate 371 having a magnetic material may be attached to a first side surface (a side surface parallel to the second direction) of the recess 372. In this case, since the protrusion 370 is a magnet and the thin plate 371 is a magnetic material body, an attractive force acts between the protrusion 370 and the thin plate 371. Therefore, in a state in which the protrusion 370 inserted into the recess 372, a movement of the protrusion 370 in the first direction is restrained, and a movement of the protrusion 370 in the second direction that is orthogonal to the first direction is allowed.

Therefore, even if an alignment state of the vibration shaft 320 (otherwise, the movable part) in the first direction is slightly skewed during an assembling process or even if a change occurs in a distance between the movable part 34 and the friction moving part 36 when a bending occurs in the vibration shaft 320 during a process in which the vibration shaft 320 is vibrated by the vibration generator 322, the connecting part 37 is moved in the second direction and responds to the change in the distance, so that the movable part 34 is capable of being smoothly moved in the first direction without being affected.

That is, a problem of a conventional technology (a problem in which a movable part is not smoothly moved in an optical axis direction or becomes an immovable state) may be clearly and definitively resolved, in which a misalignment of the vibration shaft 320 (otherwise, the movable part) or an uneven distance (a situation in which a distance between the movable part 34 and the vibration shaft 320 should be maintained uniformly over an entire moving range (a stroke) of the movable part 34 but is not satisfied) between the movable part 34 and the vibration shaft 320 due to bending and so on of the vibration shaft 320 affects mobility of the movable part 34.

In some cases, contrary to the embodiment described above, there may also be a variation of the embodiment. In the variation of the embodiment, the protrusion 370 has a magnetic material, and a thin-plate type magnet is attached to a first side surface (a side surface parallel to the second direction) of the recess 372, the thin-plate type magnet generating an attractive force with the protrusion 370 having the magnetic material so as to restrain the movement of the protrusion 370 in the first direction within a section where the recess 372 is formed and to allow the movement of the protrusion 370 in the second direction that is orthogonal to the first direction.

FIG. 6 shows several exemplary embodiments of the part (the connecting part) to which the friction moving part and the movable part are coupled.

As other exemplary embodiments illustrated in FIG. 6, an elastic means 374 that is elastically in close contact with the protrusion 370 inserted into the recess 372 may be mounted on the first side surface (the side surface parallel to the second direction) of the recess 372 that constitutes the connecting part 37.

In this case, a surface of the protrusion 370 positioned at an opposite surface that is in elastically contact with the elastic means 374 by an elasticity of the elastic means 374 is maintained in a state in which the surface is in close contact with other side surface of the recess 372, so that the movement of the protrusion 370 in the first direction is restrained and only the movement of the protrusion 370 in the second direction is allowed.

Figure 6A:
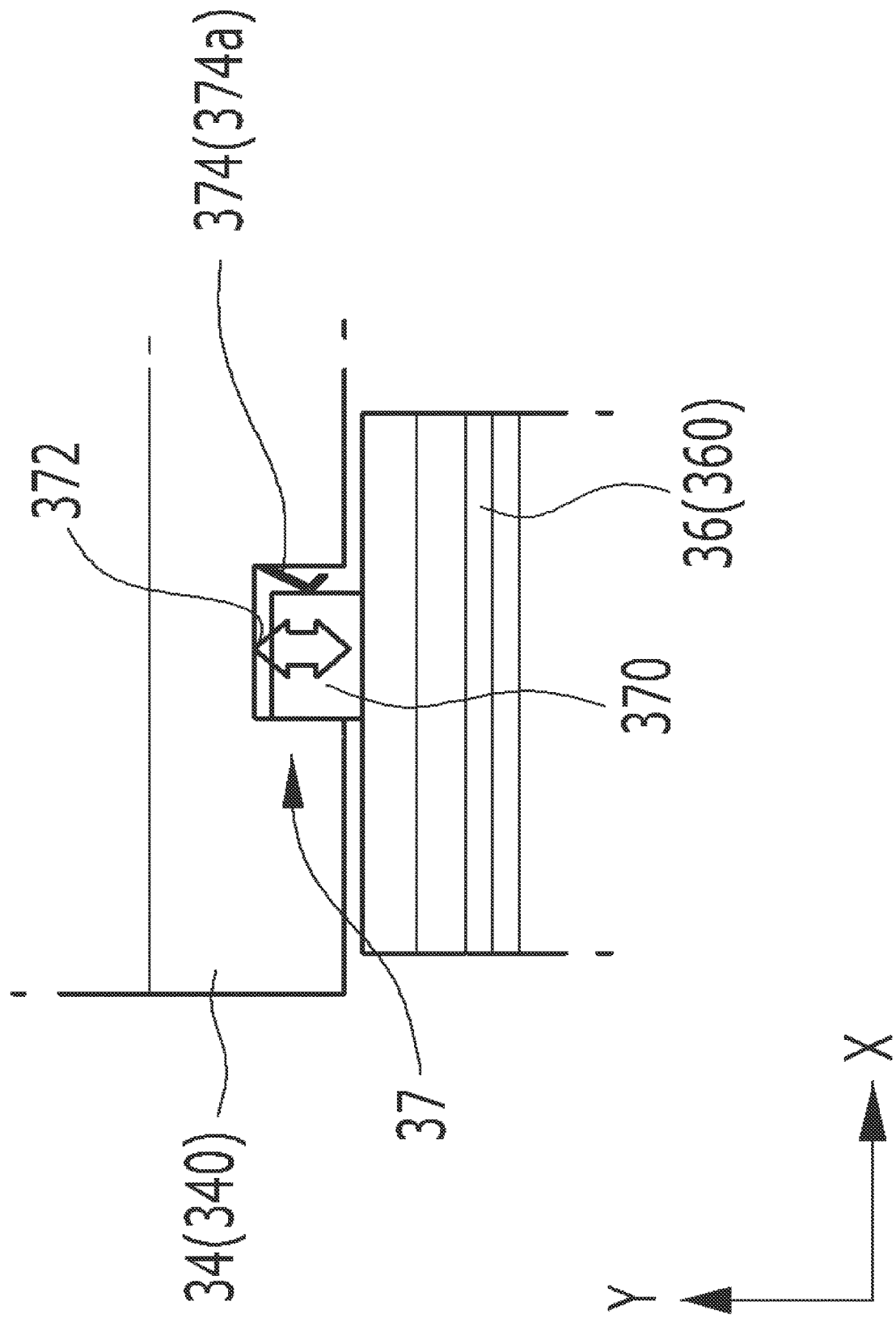
FIG. 6 shows several exemplary embodiments of the part (the connecting part) to which the friction moving part and the movable part are coupled.
Figure 6B:
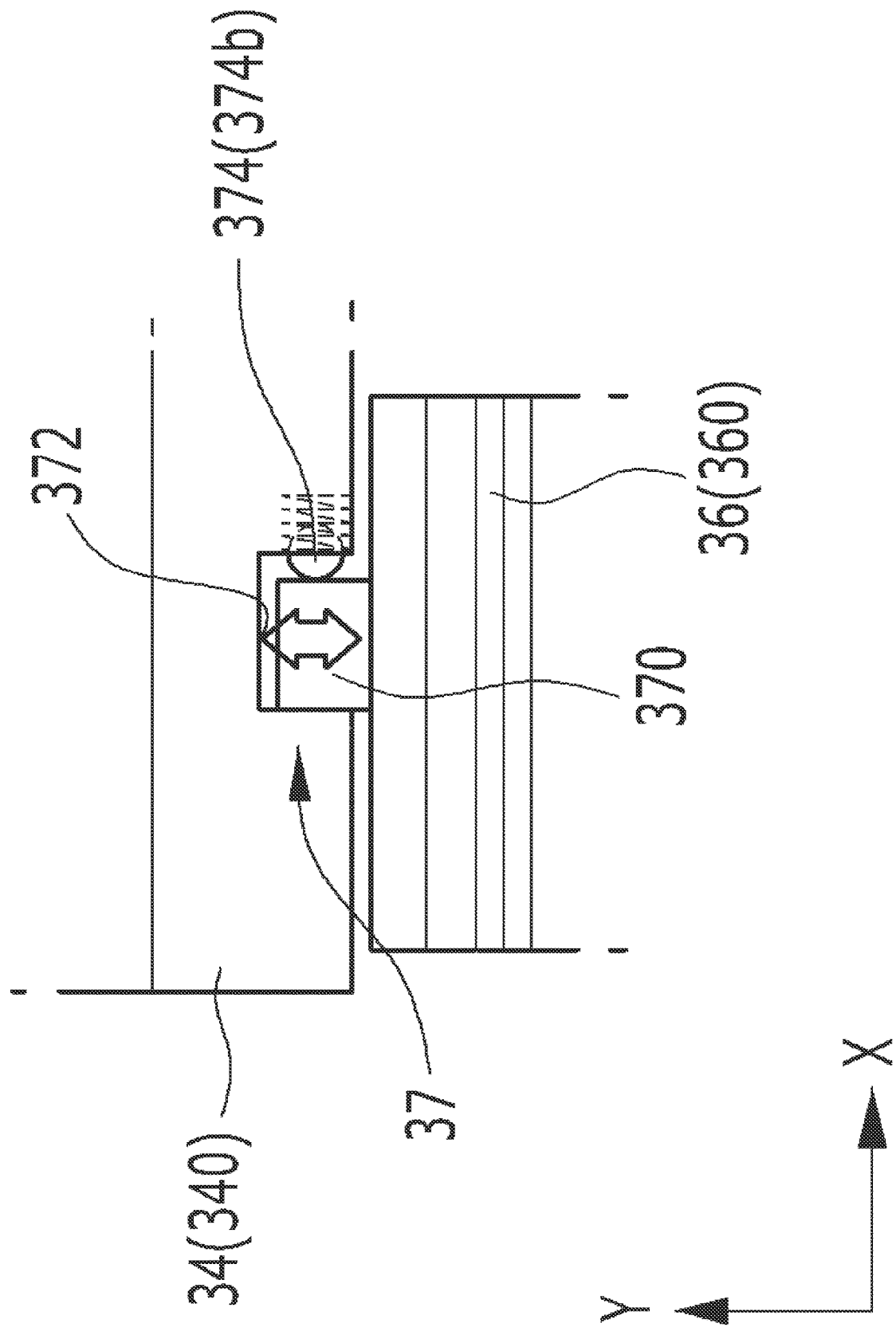

Preferably, as illustrated in FIG. 6A, the elastic means 374 may be a leaf spring 374a applying an elastic force to the protrusion 370 within the recess 372 so that the first side surface of the protrusion 370 is in close contact with the other side surface of the recess 372 facing the first side surface. In some cases, as illustrated in FIG. 6B, the elastic means 374 may be provided in the form of a ball plunger 374b that is constituted of a ball and a spring.

Meanwhile, at least two Hall sensors 308 may be aligned to be spaced apart from each other in the first direction in the respective openings 303 and 305 of the first side wall 302 and the second side wall 304 that are described above. In addition, respective Hall magnets 344 may be mounted on the side surface of the first movable part 34a facing the first side wall 302 and the side surface of the second movable part 34b facing the second side wall 304 so as to correspond to the Hall sensors 308 (see FIG. 1 and FIG. 2).

The Hall sensors 308 use the Hall effect, detect positions of the Hall magnets 344 and generate corresponding signals, and output the signals to the driver IC (not illustrated). Furthermore, the driver IC is configured to recognize positions of the first movable part 34a and the second movable part 34b in the first direction within the housing 30 from the signals of the Hall sensors 308. In addition, control values for the first driving unit 32a and the second driving unit 32b are determined on the basis of recognized position values.

That is, the driver IC recognizes the correct positions of the first movable part 34a and the second movable part 34b in the first direction from the signals output from the Hall sensors 308, the control values of the first driving unit 32a and the second driving unit 32b are determined on the basis of recognized position information, and the positions of the first movable part 34a and the second movable part 34b in the first direction are independently feedback-controlled through the first driving unit 32a and the second driving unit

32*b* on the basis of determined control values, thereby realizing zoom and auto-focusing functions.

Figure 7:
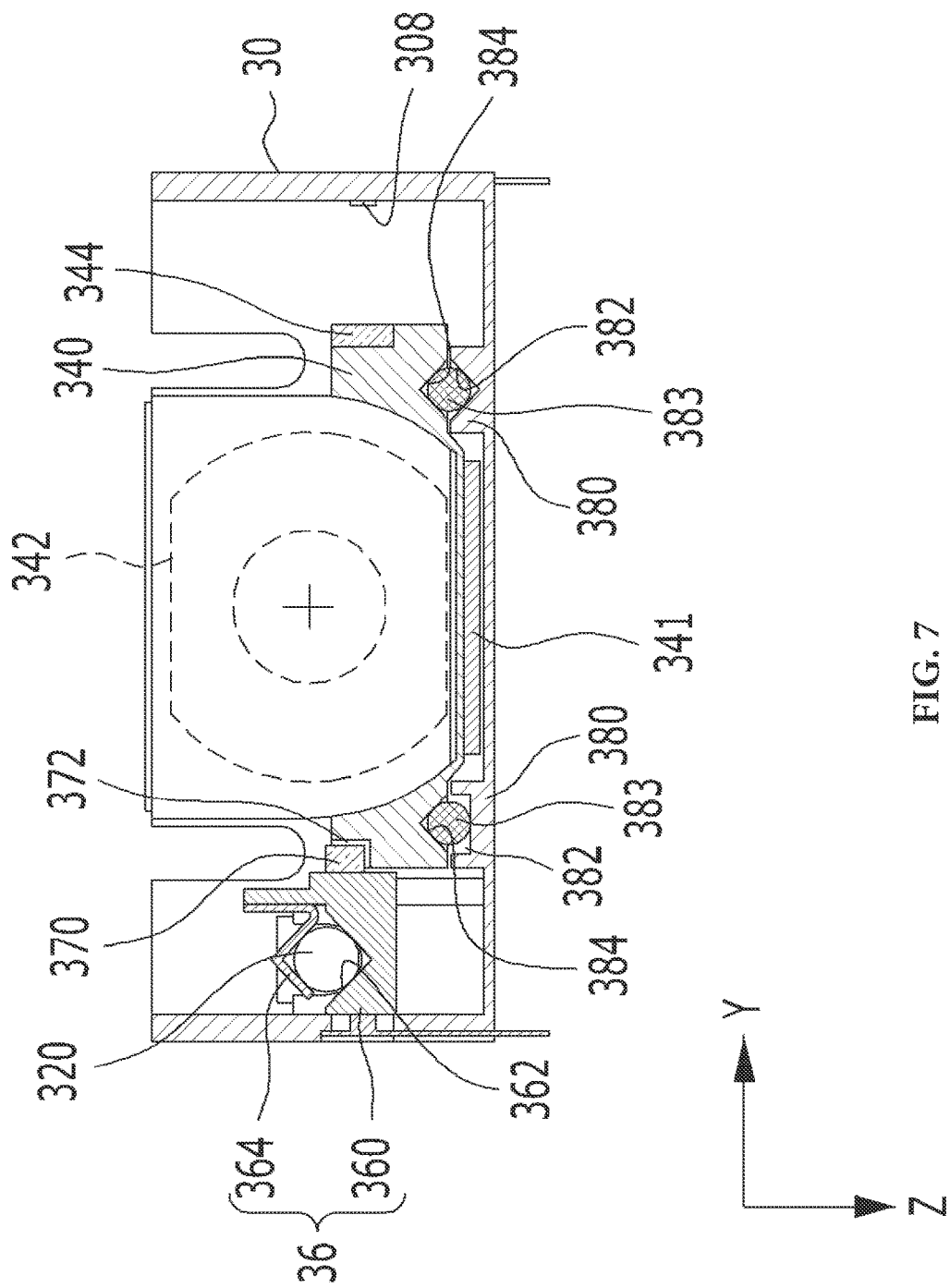
FIG. 7 is a cross-sectional view illustrating the camera actuator in FIG. 3 taken along line A-A in FIG. 3.

FIG. 7 is a cross-sectional view illustrating the camera actuator in FIG. 3 taken along line A-A in FIG. 3.

Referring to FIG. 7 together with FIGS. 1 and 2, the ball guide 38 may be mounted between the housing 30 and the first movable part 34*a* and between the housing 30 and the second movable part 34*b*. The ball guide 38 serves to align the first movable part 34*a* and the second movable part 34*b* along the optical axis, and also serves to guide the first and second movable parts 34*a* and 34*b* such that an independent linear motion (a translation motion) of the first and second movable parts 34*a* and 34*b* in the first direction with respect to the housing 30 between the housing 30 and the first and second movable parts 34*a* and 34*b* are stably realized.

Preferably, the ball guide 38 may include: a pair of ball rails 380 parallel to each other, the pair of ball rails 380 being disposed on the upper surface of the bottom portion of the housing 30 and being elongated along the first direction, and the pair of ball rails having upper portions thereof each provided with a first ball recess 382; a second ball recess 384 formed in a first side and an opposing second side of each lower surface of the first and second movable parts 34*a* and 34*b* so as to correspond to the first ball recess 382; and balls 383 interposed between the first ball recess 382 and the second ball recess 384 that are corresponding to each other so as to face each other.

Figure 8:
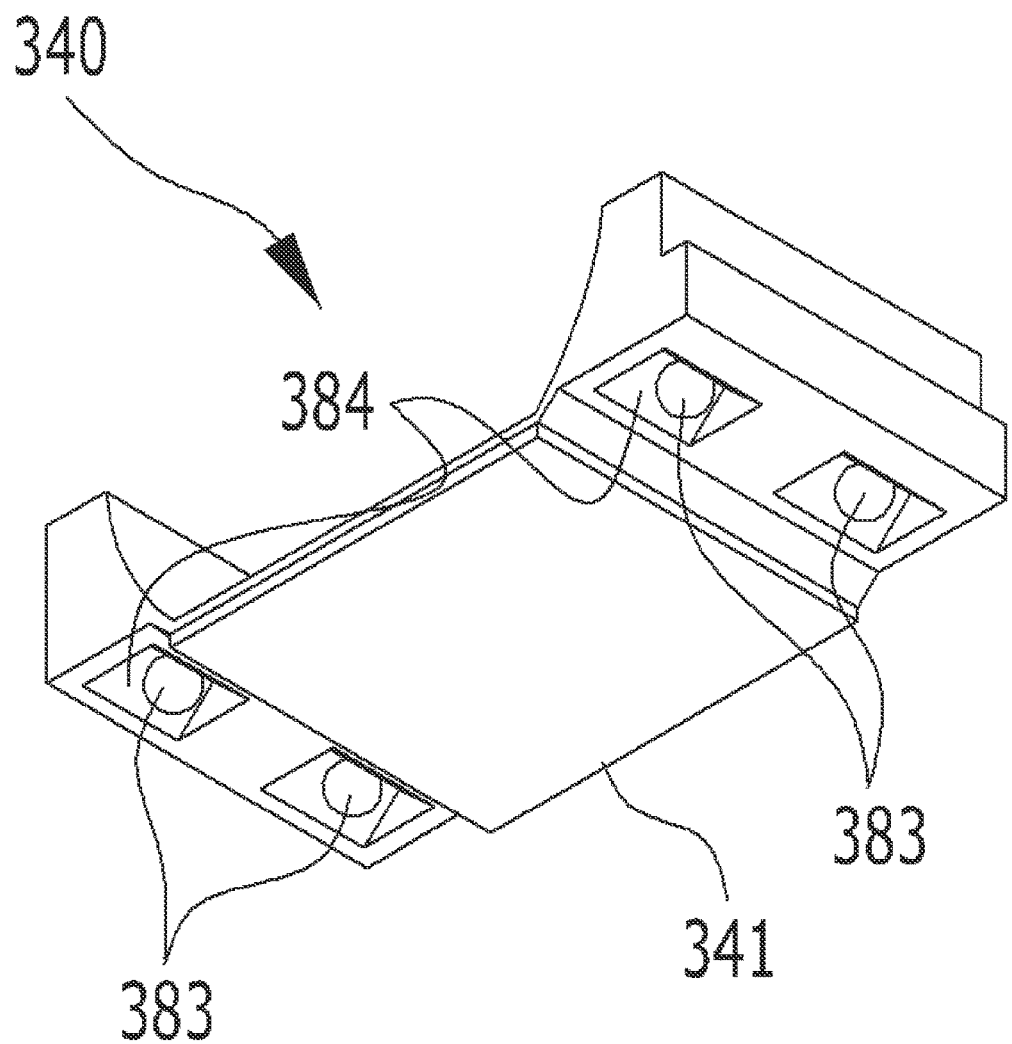
FIG. 8 is a perspective view illustrating a carrier constituting the movable part when viewed from a bottom surface.
Figure 8:
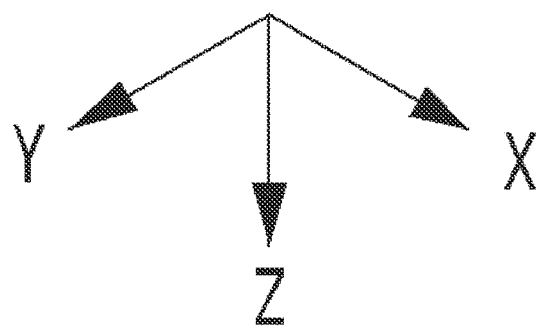

The second ball recess 384, more specifically, is a pocket type ball recess illustrated in FIG. 8 in which the carrier 340 is viewed from the bottom surface. Furthermore, at least two second ball recesses 384 may be formed in the first side and the opposing second side of each lower surface of the carriers 340 of each of the first and second movable parts 34*a* and 34*b* so that independent space shapes are formed. As such, since balls are interposed one by one in each of the second ball recesses 384 formed in the independent space shapes, interference and friction between the balls 383 adjacent to each other while the movable part 34 is moved may be prevented.

Here, specifically, in consideration of assemblability and drivability according to manufacturing tolerances between the carrier 340 and the housing 30, it is preferable that one of the pair of parallel ball rails 380 is configured such that the first ball recess 382 that is continuous in the first direction has a V-shaped recess and other of the pair of parallel ball rails 380 is configured such that the first ball recess 382 has a U-shaped recess.

A part of each of the balls 383 may be accommodated in the first ball recess 382 and other part of each of the balls 383 may be accommodated in the second ball recess 384. Accordingly, when the second ball recess 384 moves relative to the first ball recess 382 by a linear motion in the first direction of the movable part 34, the balls 383 roll between the first and second ball recesses 382 and 384, so that the linear motion in the first direction of the movable part 34 within the housing 30 may be smoothly and stably performed.

As illustrated in FIGS. 7 and 8, magnets 341 are respectively mounted at each bottom surface of the first and second movable parts 34*a* and 34*b*, each bottom surface facing the upper surface of the bottom portion of the housing 30, and the housing 30 may be entirely or partially (the bottom portion) formed of a magnetic material. In this case, since the first and second movable parts 34*a* and 34*b* are moved while being in close contact with the bottom portion of the housing 30 with the ball guide 38 interposed therebetween by an attractive force between the bottom portion of the housing 30 and the magnets 341, so that lifting and tilting of the movable part 34 during a movement of the movable part 34 is prevented.

Reference numeral 39 which is not described refers to a fixed optical unit (see FIGS. 1 to 3). As illustrated in the example in the drawings (FIGS. 1 to 3), such a fixed optical unit 39 may be disposed at an opening portion of a first side of the housing 30 into which light is introduced, and may include a lens barrel that accommodates a lens group constituted of a plurality of lenses. At this time, each lens may have the same or different optical characteristics such as a focal length, a refractive index, and so on.

In a conventional piezo-type camera actuator developed as an alternative to a stepping motor-type camera actuator, when a parallel state of a vibration shaft to a guide pin is slightly skewed or when the vibration shaft is slightly bent during a vibration process, a movable part including an optical system may be caught between the guide pin and the vibration shaft, so that a movement may not be performed smoothly or an immovable state of the movable part may occur.

On the other hand, in the camera actuator according to an embodiment of the present disclosure, even if an alignment state of the vibration shaft (otherwise, the movable part) in the first direction is slightly skewed during an assembling process or even if a change occurs in a distance between the movable part and the friction moving part when a bending occurs in the vibration shaft during a process in which the vibration shaft is vibrated, the connecting part is capable of responding to the change in the distance, so that the movable part is capable of being smoothly moved in the first direction without being affected.

That is, a problem of a conventional technology (a problem in which a movable part is not smoothly moved in the first direction or becomes an immovable state) may be clearly and definitively resolved, in which a misalignment of the vibration shaft (otherwise, the movable part) or an uneven distance (a situation in which a distance between the movable part and the vibration shaft should be maintained uniformly over an entire moving range (a stroke) of the movable part but is not satisfied) between the movable part and the vibration shaft due to bending and so on of the vibration shaft affects mobility of the movable part.

In addition, by applying a piezo-type camera actuator that is advantageous for realizing miniaturization and light-weight comparing to a conventional stepping motor-type camera actuator, the configuration is simple and assembling is as easy as the simple configuration, so that the present disclosure is advantageous in terms of mass production of a product. Furthermore, since the movable part performs a smooth and stable linear motion by the ball guide while being in close contact with the bottom portion of the housing by the magnet mounted at the lower surface of the movable part, a separate guide pin for optical axis alignment is not required.

Figure 9:
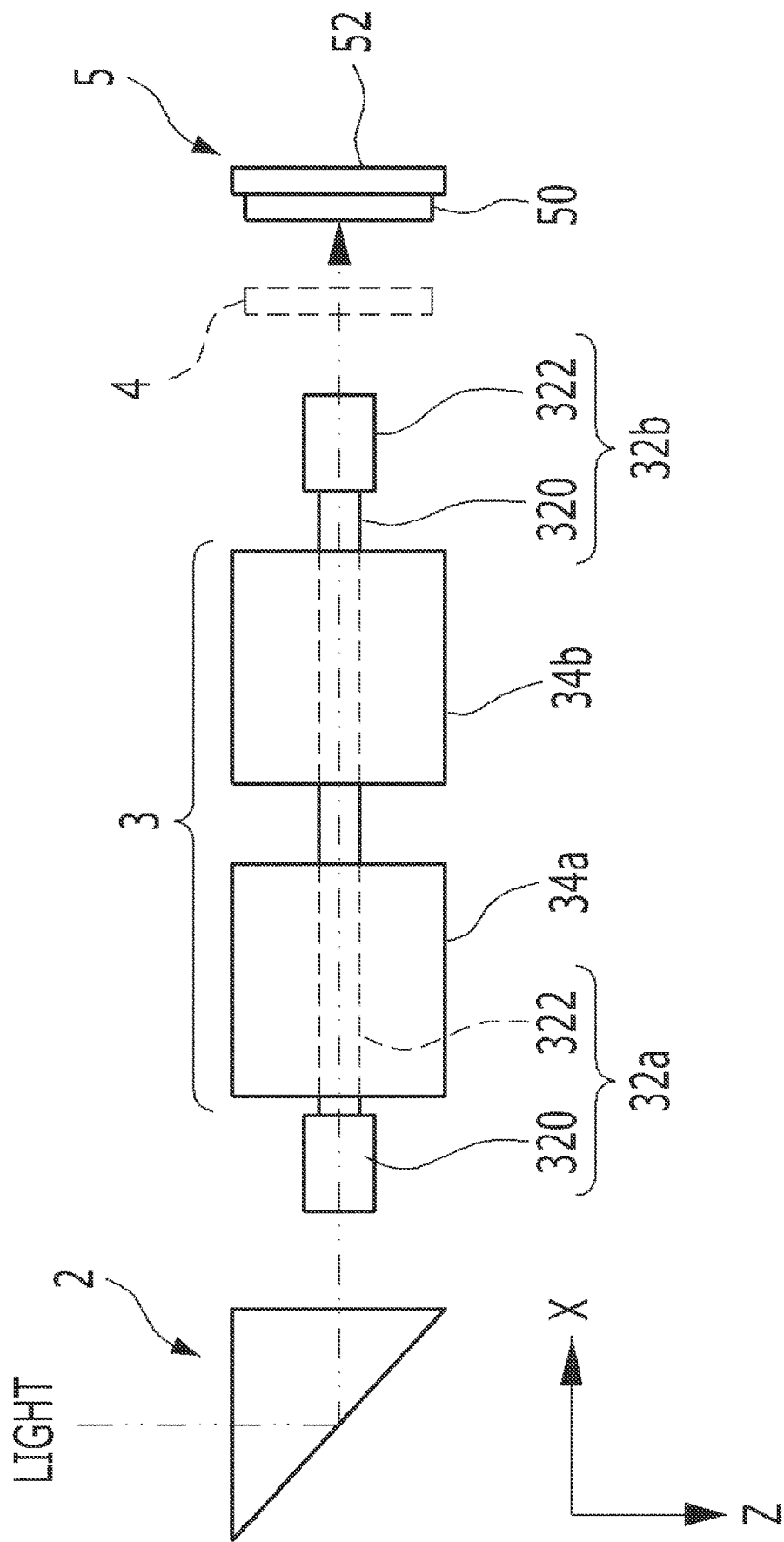
FIG. 9 is a schematic view illustrating a folded zoom camera module according to another aspect of the present disclosure.
Figure 10:
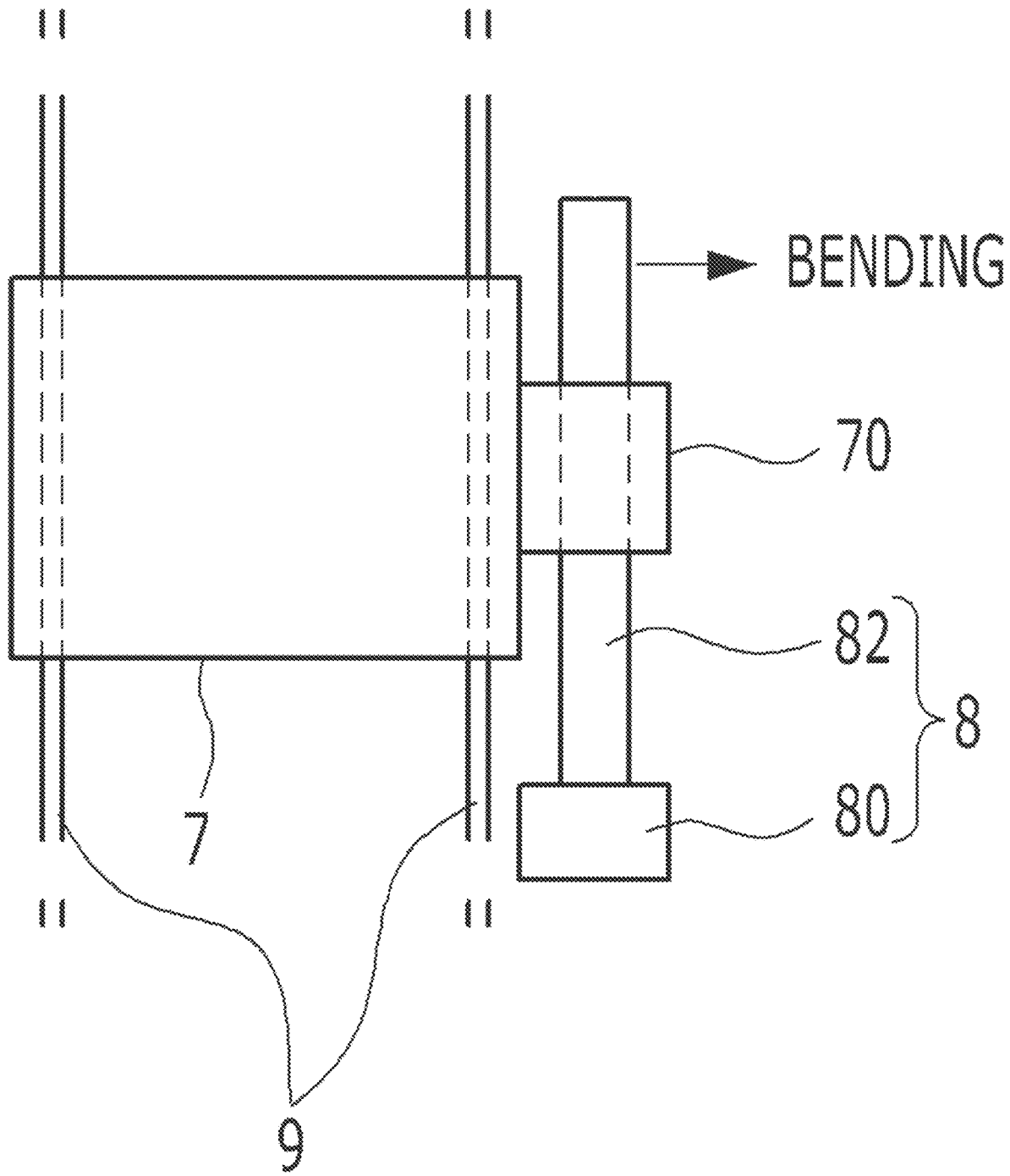
FIG. 10 is a schematic view illustrating a conventional piezo-type optical system driving apparatus.

Meanwhile, FIG. 9 is a schematic view illustrating a folded zoom camera module including the camera actuator according to the foregoing aspect of the present disclosure.

Referring to FIG. 9, a folded zoom camera module according to another aspect of the present disclosure includes a reflectometer 2, a camera actuator 3, and an image sensor unit 5. The camera actuator 3 may be the camera actuator 3 according to the foregoing aspect of the present disclosure, and the reflectometer 2 is disposed in front of the camera actuator 3 with respect to a moving direction of light and reflects light incident from the outside toward the camera actuator 3.

The reflectometer 2 may be a mirror or a prism in which a reflective surface 20 that reflects light incident from the outside is tilted at a specific angle which is preferably at an angle of 45 degrees, and the camera actuator 3 may be configured such that two or more movable parts 34a and 34b constituting the camera actuator 3 are individually operated in the first direction by the driving unit 32 that is configure to correspond to each of the movable parts 34a and 34b.

As such, when two or more movable parts 34a and 34b are individually operated, zoom-in and zoom-out functions are realized over a wide range, so that more elaborate, detailed, and high-magnification zoom performance may be exhibited.

The image sensor unit 5 receives light passing through the movable part of the camera actuator 3, and outputs image information corresponding to the received light. Such an image sensor unit 5 includes a substrate 52 and an image sensor 50 mounted on the substrate 52. Here, the image sensor 50 collects image information from light passing through the movable parts 34a and 34b, and the collected image information may be output to the outside through the substrate 52.

An IR filter 4 may be mounted on an optical path between the camera actuator 3 and the image sensor unit 5. The IR filter 4 filters a specific wavelength included in incident light, preferably an infrared wavelength, and functions so that light in which the infrared wavelength is filtered is capable of being projected on the image sensor unit 5. An example in which the IR filter 4 is disposed between the camera actuator 3 and the image sensor unit 5 in the drawings, but is not limited thereto.

In the detailed description of the present disclosure described above, only a specific embodiment was described. However, the present disclosure should not be construed as being limited to the specific embodiment described above, but should be construed as including all changes, equivalents, and substitutions within the spirit of the present disclosure defined in the claims.

The invention claimed is:

1. A camera actuator, comprising:
    a housing;
    a driving unit mounted in the housing, the driving unit comprising a vibration shaft that extends in a first direction, and the driving unit comprising a vibration generator configured to apply vibration to the vibration shaft in the first direction;
    a movable part mounted so as to correspond to the driving unit, the movable part configured to be moved in the first direction within the housing by a driving force generated by the driving unit;
    a friction moving part configured to be moved in the first direction on the vibration shaft; and
    a connecting part mutually connecting the friction moving part and the movable part;
    wherein the connecting part comprises:
        a protrusion or a recess formed on a side surface portion of the friction moving part facing the movable part; and
        a recess or a protrusion formed on a side surface portion of the movable part so as to be engaged with the protrusion or the recess formed on the side surface portion of the friction moving part; and
    wherein the protrusion is a magnet, and a thin plate having a magnetic material that generates an attractive force with the protrusion formed of the magnet is attached to a first side surface of the recess such that a movement of the protrusion in the first direction within a section where the recess is formed is restrained and a movement of the protrusion in a second direction that is orthogonal to the first direction is allowed.

2. The camera actuator of claim 1, wherein the driving unit comprises two or more driving units, and the movable part comprises two or more movable parts so as to correspond one-to-one to the two or more driving units.

3. The camera actuator of claim 2, wherein each of the driving units comprises:
    a first driving unit positioned to be adjacent to a first side wall of the housing and mounted in the housing, the first driving unit comprising the vibration shaft that extends in the first direction, and the first driving unit comprising the vibration generator configured to apply vibration to the vibration shaft in the first direction; and
    a second driving unit positioned to be adjacent to a second side wall facing the first side wall, the second driving unit having a configuration that is the same as a configuration of the first driving unit and in which a position of the vibration generator of the second driving unit is reversed, and
    wherein each of the movable parts comprises:
    a first movable part configured to perform a translation motion in the first direction within the housing by a driving force generated by the first driving unit; and
    a second movable part coaxially aligned with the first movable part in the first direction within the housing, the second movable part configured to perform a translation motion in the first direction in the first direction within the housing by a driving force generated by the second driving unit.

4. The camera actuator of claim 2, wherein the two or more movable parts are configured to be independently driven in the first direction by each of the driving units respectively corresponding to the two or more movable parts.

5. The camera actuator of claim 2, wherein at least two Hall sensors are aligned to be spaced apart from each other in the first direction on each of first and second side walls of the housing, the second side wall facing the first side wall, and Hall magnets corresponding to the Hall sensors are mounted on a side surface of a first movable part facing the first side wall and on a side surface of a second movable part facing the second side wall.

6. The camera actuator of claim 1, wherein the movable part comprises:
    a carrier; and
    a lens barrel mounted on the carrier, the lens barrel accommodating a lens group that comprises a plurality of lenses.

7. The camera actuator of claim 1, wherein the vibration generator of the driving unit is a piezo motor comprising a piezoelectric element.

8. The camera actuator of claim 1, wherein the friction moving part comprises:
    a lower friction block having a groove that has a shape of a cross-sectional area which is an arc shape or an angular shape; and
    an upper friction clip coupled to the lower friction block from an upper portion of the lower friction block with the vibration shaft interposed therebetween, the upper friction clip having a shape of a cross-sectional area that is same as and vertically symmetrical with the shape of the cross-sectional area of the groove.

9. The camera actuator of claim 1, further comprising a ball guide guiding a translation motion in the first direction of the movable part with respect to the housing from between the housing and the movable part.

10. The camera actuator of claim 9, wherein the ball guide comprises:
a pair of ball rails each having a first ball recess which is disposed and elongated on an upper surface of a bottom portion of the housing along the first direction and which is continuous in the first direction;
a second ball recess formed in a first side and an opposing second side of a lower surface of the movable part so as to correspond to the first ball recess; and
balls interposed between the first ball recess and the second ball recess that correspond to each other so as to face each other.

11. The camera actuator of claim 10, wherein the second ball recess is a pocket type ball recess, and at least two second ball recesses are formed in the first side and the opposing second side of the lower surface of the movable part so that independent space shapes are formed, and the balls are interposed one by one in each of the second ball recesses formed in the independent space shapes.

12. A folded zoom camera module comprising:
the camera actuator according to claim 1;
a prism disposed in front of the camera actuator with respect to a moving direction of light, the prism reflecting light incident from the outside toward the camera actuator; and
an image sensor unit disposed in rear of the camera actuator with respect to the moving direction of light, the image sensor unit configured to receive light passing through the camera actuator and generate and output image information corresponding to light that is received.

13. A camera actuator, comprising:
a housing;
a driving unit mounted in the housing, the driving unit comprising a vibration shaft that extends in a first direction, and the driving unit comprising a vibration generator configured to apply vibration to the vibration shaft in the first direction;
a movable part mounted so as to correspond to the driving unit, the movable part configured to be moved in the first direction within the housing by a driving force generated by the driving unit;
a friction moving part configured to be moved in the first direction on the vibration shaft; and
a connecting part mutually connecting the friction moving part and the movable part;
wherein the connecting part comprises:
a protrusion or a recess formed on a side surface portion of the friction moving part facing the movable part; and
a recess or a protrusion formed on a side surface portion of the movable part so as to be engaged with the protrusion or the recess formed on the side surface portion of the friction moving part; and
wherein an elastic means elastically in close contact with the protrusion is mounted at a first side surface of the recess such that a movement of the protrusion in the first direction within a section where the recess is formed is restrained and a movement of the protrusion in a second direction that is orthogonal to the first direction is allowed.

14. The camera actuator of claim 13, wherein the elastic means is a leaf spring or a ball plunger that is formed of a ball and a spring, the leaf spring or the ball plunger configured to apply an elastic force to the protrusion so that a first side surface of the protrusion is in close in contact with other first side surface of the recess facing the protrusion.

15. A camera actuator, comprising:
a housing;
a driving unit mounted in the housing, the driving unit comprising a vibration shaft that extends in a first direction, and the driving unit comprising a vibration generator configured to apply vibration to the vibration shaft in the first direction;
a movable part mounted so as to correspond to the driving unit, the movable part configured to be moved in the first direction within the housing by a driving force generated by the driving unit;
a friction moving part configured to be moved in the first direction on the vibration shaft; and
a connecting part mutually connecting the friction moving part and the movable part;
wherein the connecting part comprises:
a protrusion or a recess formed on a side surface portion of the friction moving part facing the movable part; and
a recess or a protrusion formed on a side surface portion of the movable part so as to be engaged with the protrusion or the recess formed on the side surface portion of the friction moving part; and
wherein the protrusion is formed of a magnetic material, and a thin plate-type magnet that generates an attractive force with the protrusion having the magnetic material is attached to a first side surface of the recess such that a movement of the protrusion in the first direction within a section where the recess is formed is restrained and a movement of the protrusion in a second direction that is orthogonal to the first direction is allowed.

16. A camera actuator, comprising:
a housing;
a driving unit mounted in the housing, the driving unit comprising a vibration shaft that extends in a first direction, and the driving unit comprising a vibration generator configured to apply vibration to the vibration shaft in the first direction;
a movable part mounted so as to correspond to the driving unit, the movable part configured to be moved in the first direction within the housing by a driving force generated by the driving unit;
a friction moving part configured to be moved in the first direction on the vibration shaft;
a connecting part mutually connecting the friction moving part and the movable part; and
a ball guide guiding a translation motion in the first direction of the movable part with respect to the housing from between the housing and the movable part;
wherein the connecting part comprises:
a protrusion or a recess formed on a side surface portion of the friction moving part facing the movable part; and
a recess or a protrusion formed on a side surface portion of the movable part so as to be engaged with the protrusion or the recess formed on the side surface portion of the friction moving part; and
wherein the housing is formed of a magnetic material, and a magnet is mounted at a lower surface of the movable part facing an upper surface of a bottom portion of the housing.

* * * * *